Patented May 19, 1925.

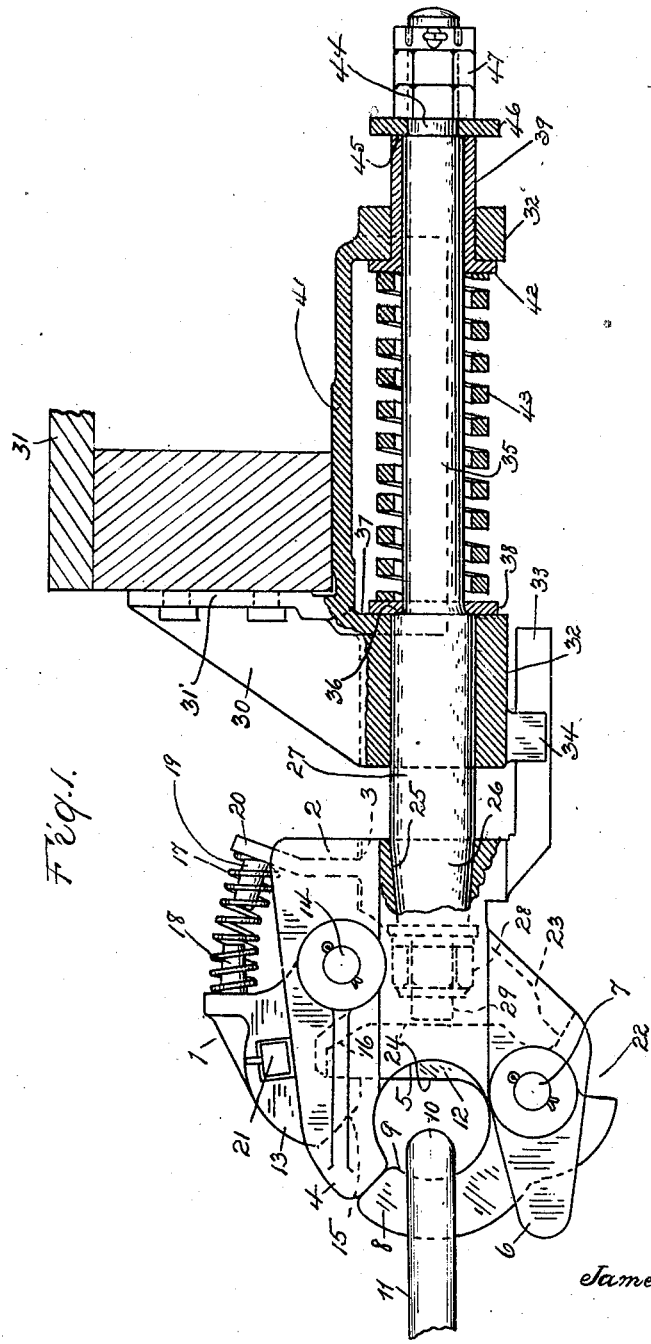

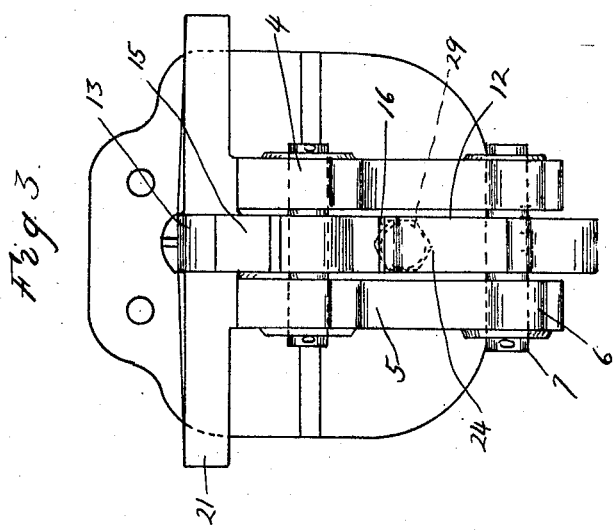

1,537,935

UNITED STATES PATENT OFFICE.

JAMES HARRY CLARK, OF RIVER ROUGE, MICHIGAN.

AUTOMATIC COUPLER FOR VEHICLES.

Application filed February 26, 1923. Serial No. 621,447.

*To all whom it may concern:*

Be it known that I, JAMES HARRY CLARK, a citizen of the United States of America, residing at River Rouge, in the county of Wayne and State of Michigan, have invented certain new and useful Improvements in Automatic Couplers for Vehicles, of which the following is a specification, reference being had therein to the accompanying drawings.

This invention relates to draft appliances and refers more particularly to couplers for trucks, trailers and the like.

An object of the invention is to provide a simple and reliable coupler which is preferably supported from the truck by means of a draft connection that is adapted to yieldably resist either tension or compression.

Another object is to provide a practical and efficient coupler which operates automatically for connecting the truck to another vehicle.

Another object is to provide a strong and durable construction which can be manufactured at a comparatively low cost.

With the above and other objects in view, the invention consists in certain novel features of construction, combination and arrangement of parts as will be more fully described and particularly pointed out in the appended claims.

In the accompanying drawings:

Figure 1 is a side elevation of a coupler embodying my invention and showing parts of the draft connection is section;

Figure 2 is a fragmentary elevation of the coupler and showing the U-shaped jaw in lowered position;

Figure 3 is a front elevation of the construction shown in Figure 2.

Referring now to the drawings in which like characters of reference designate corresponding parts throughout the several views, the numeral 1 designates a coupler head comprising parallel vertical side portions 2 and a transversely extending portion 3 connecting the side portions together at the rear end thereof. A pair of curved jaws 4 extend forwardly from the side portions 2 of the head at the upper end thereof and connect into curved portions 5 of the sides, while a pair of spaced parallel tapering lugs 6 extend forwardly from the side portions 2 of the head at the lower end thereof and also connect into the curved portions 5. A removable horizontal pin 7 extends through the lugs 6 and supports a substantially U-shaped jaw 8. One arm of the jaw 8 is preferably curved as shown at 9 and is adapted to cooperate with the jaws 4 to form an eye to receive the eye 10 of a vehicle drawbar 11 while the other arm 12 of the jaw 8 is preferably straight and is adapted to be held in raised position by means of a hooked member 13 which is pivoted upon a removable horizontal pin 14 extending through the side portions 2 of the head. The hooked end of the member 13 is preferably provided with an inclined portion 15 which is adapted to be engaged by an inclined portion 16 of the arm 12 at the upper end thereof when the jaw 8 is moved upwardly. A coil spring 17 surrounds a pair of opposed pegs 18 and 19 respectively upon the hooked member 13 and upon an upstanding web 20 between the side portions 2 of the head and normally retains the hooked member in the path of the pivoted jaw 8. Thus, when the jaw 8 is moved upwardly, the arm 12 will move the hooked member 13 upwardly until the arm passes beyond the hooked end of the member 13 whereupon the latter will be moved downwardly by means of the spring 17 with the result that the jaw 8 will be retained in cooperative position with respect to the jaws 4.

A pair of lugs 21 extend outwardly from the sides of the hooked member 13 and are adapted to engage the upper edges of the side portions 2 to limit the downward movement of the hooked member, while a lug 22 is preferably formed integral with the curved arm 9 of the jaw 8 and is adapted to engage a downwardly inclined web 23 between the side portions 2 of the head to limit the downward movement of the jaw 8.

In use, the eye 10 of the vehicle drawbar may be engaged forcibly with the rear side 24 of the arm 12 with the result that the jaw 8 will be moved upwardly into locking engagement with the hooked member 13.

The coupler is preferably supported from a vehicle by means of a yieldable draft connection which is adapted to resist either tension or compression.

In detail, the transversely extending portion 3 of the coupler head is provided with a tapered opening 25 which receives the tapered portion 26 of a drawbar 27. A nut 28 is threaded onto the drawbar within the head and engages the transversely extending portion 3 thereof to secure the drawbar to the head. The outer end 29 of the drawbar is adapted to engage the straight arm 12 to limit the upward movement of the jaw 8.

For supporting the drawbar from the truck there is a bracket 30 having a vertical apertured portion 31' secured to the rear cross-bar 31 of a truck and provided with a pair of spaced parallel bearing portions 32 and 32' in which the drawbar is slidably mounted. A horizontal arm 33 is preferably formed integral with the head 1 of the coupler at the rear end thereof and extends between a pair of spaced lugs 34 which project downwardly from the bracket 30 so as to prevent the coupler head from rotating about the drawbar.

The drawbar is preferably reduced as shown at 35 to provide an annular shoulder 36 which is normally flush with the inner end 37 of the bracket bearing 32. A metallic washer 38 surrounds the reduced portion of the drawbar and normally engages both the annular shoulder 36 and the inner end of the bracket bearing 32. A sleeve 39 surrounds the reduced portion 35 of the drawbar adjacent to the inner end thereof and is slidably mounted in the bearing 32' which is connected to the vertical portion 30' of the bracket 30 by means of a relatively long horizontal arm 41. An annular flange 42 is formed integral with the sleeve 39 at the outer end thereof and normally engages the outer end of the bearing 32', while a coil spring 43 of predetermined weight surrounds the reduced portion 35 of the drawbar between the washer 38 and the flange 42 and is adapted to resist either tension or compression on the drawbar.

The drawbar is preferably reduced further at its inner end as shown at 44 to provide an annular shoulder 45. A metallic washer 46 surrounds the reduced portion 44 of the drawbar and is normally retained in engagement with the shoulder 45 by means of a pair of nuts 47. The washer 46 normally engages the inner end of the sleeve 39 and is adapted to engage the inner end of the bearing 32' to limit the outward movement of the drawbar should the spring 43 be unable to take care of the tension on the drawbar. Should the spring 43 be unable to take care of the compression on the drawbar 27, then the inner end 48 of the coupler head will engage the outer end 49 of the bracket bearing 32.

While it is believed that from the foregoing description the nature and advantages of the invention will be readily apparent, I desire to have it understood that I do not limit myself to what is herein shown and described and that such changes may be resorted to when desired as fall within the scope of what is claimed.

What I claim as my invention is:

1. The combination with a coupler of a draft connection for said coupler including a bracket for attachment to a vehicle, a drawbar slidably mounted in said bracket and connected to said coupler, yieldable means for resisting either tension or compression on said drawbar, and annular means intermediate the ends of said drawbar and adapted to abut an outer edge of said bracket for limiting the sliding movement of said drawbar.

2. The combination with a coupler, of a draft connection for said coupler including a bracket having an upper portion for attachment to a vehicle, a drawbar slidably mounted in the lower portion of said bracket and connected to said coupler, yieldable means for resisting either tension or compression on said drawbar, and means for limiting the sliding movement of said drawbar in one direction, said coupler being adapted to engage said bracket to limit movement of said drawbar in the opposite direction.

3. The combination with a coupler, of a draft connection for said coupler including a bracket having an upper portion adapted to be secured to a vehicle and a lower portion having a pair of bearings, a drawbar slidably mounted in said bearings, yieldable means between said bearings for resisting either tension or compression on said drawbar, and means for limiting sliding movement of said drawbar in one direction, said coupler being adapted to engage one of said bearings to limit movement of said drawbar in the opposite direction.

4. The combination with a coupler, of a draft connection for said coupler including a bracket adapted to be secured to a vehicle and having a pair of bearings, a drawbar slidably mounted in said bearings, yieldable means between said bearings for resisting either tension or compression on said drawbar, and annular means upon said drawbar engageable with one of said bearings for limiting sliding movement of said drawbar in one direction, said coupler being adapted to engage the other of said bearings to limit movement of said drawbar in the opposite direction.

5. The combination with a coupler having a stationary jaw and a cooperating movable jaw, of a draft connection for said coupler including a drawbar connected to said coupler and adapted to limit movement of said movable jaw in one direction, and means for supporting said drawbar from a vehicle, while permitting of a limited sliding movement of the said drawbar.

6. The combination with a coupler, of a draft connection for said coupler including a drawbar connected to said coupler, means for supporting said drawbar from a vehicle while permitting of a limited sliding movement of the said drawbar, a member extending from said coupler, and guide means engaging said member for retaining said coupler in upright position.

7. The combination with a coupler, of a draft connection for said coupler including a drawbar connected to said coupler, a bracket for supporting said drawbar from a vehicle, a member extending from said coupler, and lugs extending from said bracket and engaging said member for retaining said coupler in upright position.

8. The combination with a coupler, of a draft connection for said coupler including a drawbar connected to said coupler, a bracket having an upper portion adapted to be secured to a vehicle and having a lower portion including a pair of spaced bearings supporting said drawbar, and yieldable means between said bearings for resisting either tension or compression on said drawbar.

9. The combination with a coupler, of a draft connection for said coupler including a drawbar connected to said coupler, a bracket having an upper portion adapted to be secured to a vehicle and having a lower portion including a pair of spaced bearings supporting said drawbar, and a coil spring surrounding said drawbar between said bearings for resisting either tension or compression on said drawbar.

10. The combination with a coupler, of a bracket having a vertical portion for attachment to a vehicle and provided with a pair of bearing portions, a drawbar slidably mounted in said bearing portions, a member secured to said drawbar and engageable with one of said bearings for limiting sliding movement of said drawbar in one direction, said coupler being adapted to engage the other of said bearings for limiting the movement of said drawbar in the opposite direction, and yieldable means between said bearings for resisting either tension or compression on said drawbar.

11. The combination with a coupler, of a bracket having a vertical portion for attachment to a vehicle and provided with a pair of bearing portions, an arm connecting one of said bearings to said vehicle portion, a member secured to said drawbar and engageable with one of said bearings for limiting sliding movement of said drawbar in one direction, said coupler being adapted to engage the other of said bearings for limiting the movement of said drawbar in the opposite direction, and yieldable means between said bearings for resisting either tension or compression on said drawbar.

12. The combination with a coupler, of a draft connection for said coupler including a bracket adapted to be secured to a vehicle and having a pair of spaced bearings, a drawbar secured to said coupler and slidably mounted in said bearings, a shoulder on said drawbar, a member normally engaging said shoulder and normally in engagement with one of said bearings, a sleeve surrounding said drawbar and having a flange normally engaging the other of said bearings, a coil spring surrounding said drawbar between said member and flange of said sleeve and adapted to resist either tension or compression on said drawbar, and a member secured to said drawbar and normally in engagement with said sleeve.

13. The combination with a coupler, of a draft connection for said coupler including a bracket adapted to be secured to a vehicle and having a pair of spaced bearings, a drawbar secured to said coupler and slidably mounted in said bearings, a shoulder on said drawbar, a washer upon said drawbar and normally engaging said shoulder, said washer also normally engaging one of said bearings, a sleeve surrounding said drawbar and having a flange normally engaging the other of said bearings, a coil spring surrounding said drawbar between said washer and the flange of said sleeve and adapted to resist either tension or compression on said drawbar, and a washer secured to said drawbar and normally in engagement with said sleeve, the last-mentioned washer being adapted to engage one of said bearings to limit movement of said drawbar in one direction, said coupler being adapted to engage the other of said bearings to limit movement of said drawbar in the opposite direction.

In testimony whereof I affix my signature.

JAMES HARRY CLARK.